(12) United States Patent
Qiao et al.

(10) Patent No.: US 10,896,556 B1
(45) Date of Patent: Jan. 19, 2021

(54) INTELLIGENT METHOD OF SELECTING INCOMING MESSAGE CHANNELS IN A V2X COMMUNICATION

(71) Applicant: Continental Automotive Systems, Inc., Auburn Hills, MI (US)

(72) Inventors: Ningsheng Qiao, Troy, MI (US); Jeremy Tuggle, Metamora, MI (US); Geoff Bauer, Oxford, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 16/724,221

(22) Filed: Dec. 21, 2019

(51) Int. Cl.
| | |
|---|---|
| G07C 5/00 | (2006.01) |
| H04W 4/40 | (2018.01) |
| G08G 1/09 | (2006.01) |
| G07C 5/08 | (2006.01) |
| B60R 21/01 | (2006.01) |
| G08G 1/0967 | (2006.01) |
| B60W 50/038 | (2012.01) |

(52) U.S. Cl.
CPC .............. *G07C 5/008* (2013.01); *B60R 21/01* (2013.01); *G07C 5/0816* (2013.01); *G08G 1/093* (2013.01); *G08G 1/09675* (2013.01); *H04W 4/40* (2018.02); *B60W 50/038* (2013.01)

(58) Field of Classification Search
CPC ....... G07C 5/008; G07C 5/0816; H04W 4/40; B60R 21/01; G08G 1/093; G08G 1/09675; B60W 50/038
USPC ........................................................ 340/905
See application file for complete search history.

(56) References Cited

U.S. PATENT DOCUMENTS

| | | | |
|---|---|---|---|
| 6,339,382 B1 | 1/2002 | Arbinger et al. | |
| 7,057,528 B1 | 6/2006 | Ewing et al. | |
| 9,165,310 B2 | 10/2015 | Liu et al. | |
| 2017/0076331 A1 | 3/2017 | Lei et al. | |
| 2019/0019410 A1 | 1/2019 | Sheynman et al. | |
| 2019/0058980 A1 | 2/2019 | Zhang et al. | |
| 2019/0082377 A1* | 3/2019 | Silver | H04W 4/027 |
| 2019/0320341 A1* | 10/2019 | Haran | H04W 48/06 |
| 2020/0008086 A1* | 1/2020 | Lu | H04W 4/80 |

FOREIGN PATENT DOCUMENTS

| | | |
|---|---|---|
| CN | 105577305 B | 5/2016 |
| KR | 20150018046 A | 2/2015 |

\* cited by examiner

*Primary Examiner* — Kerri L McNally

(57) ABSTRACT

A trigger event is detected based on a vehicle malfunction that limits maneuverability of a vehicle. An alert message is generated based on the detected trigger event, and the alert message is broadcast via a Vehicle-to-Everything (V2X) communication. Based on the detected trigger event, a receive channel mask and a transmit channel mask are generated, and a channel mask flag is set. When the channel mask flag is set, one or more incoming message channels are selected based on the incoming channel mask and the channel mask flag, and incoming V2X messages are received and processed only on the selected one or more incoming message channels. When the channel mask flag is cleared, incoming V2X messages are received and processed on the selected one or more incoming message channels and at least one additional incoming message channel.

18 Claims, 7 Drawing Sheets

| MESSAGE TYPE | PURPOSE |
|---|---|
| A LA CARTE MESSAGE | GENERIC MESSAGE WITH FLEXIBLE CONTENT |
| BASIC SAFETY MESSAGE | CONVEYS VEHICLE STATE INFORMATION NECESSARY TO SUPPORT V2V SAFETY APPLICATIONS |
| COMMON SAFETY REQUEST | A VEHICLE USES THIS TO REQUEST SPECIFIC STATE INFORMATION FROM ANOTHER VEHICLE |
| EMERGENCY VEHICLE ALERT MESSAGE | ALERTS DRIVERS THAT AN EMERGENCY VEHICLE IS ACTIVE IN AN AREA |
| INTERSECTION COLLISION AVOIDANCE | PROVIDES VEHICLE LOCATION INFORMATION RELATIVE TO A SPECIFIC INTERSECTION |
| MAP DATA | SENT BY RSU TO CONVEY THE GEOGRAPHIC DESCRIPTION OF AN INTERSECTION |
| NMEA CORRECTIONS | ENCAPSULATES ONE STYLE OF GPS CORRECTIONS - NMEA STYLE 183 |
| PROBE DATA MANAGEMENT | SENT BY RSU TO MANAGE THE COLLECTION OF PROBE DATA FROM VEHICLES |
| PROBE VEHICLE DATA | VEHICLES REPORT THEIR STATUS OVER A GIVEN SECTION OF ROAD; AGGREGATED TO DERIVE ROAD CONDITIONS |
| ROADSIDE ALERT | SENT BY RSU TO ALERT PASSING VEHICLES TO HAZARDOUS CONDITIONS |
| RTCM CORRECTIONS | ENCAPSULATES A SECOND STYLE OF GPS CORRECTIONS - RTCM |
| SIGNAL PHASE AND TIMING MESSAGE | SENT BY RSU AT A SIGNALIZED INTERSECTION TO CONVEY THE SIGNAL'S PHASE AND TIMING STATE. |
| SIGNAL REQUEST MESSAGE | A VEHICLE USES THIS TO REQUEST EITHER A PRIORITY SIGNAL OR A SIGNAL PREEMPTION. |
| SIGNAL STATUS MESSAGE | SENT BY RSU TO CONVEY THE STATUS OF SIGNAL REQUESTS. |
| TRAVELER INFORMATION | SENT BY RSU TO CONVEY ADVISORY AND ROAD SIGN TYPES OF INFORMATION |

FIG. 3

INTELLIGENT METHOD OF SELECTING INCOMING MESSAGE CHANNELS IN A V2X COMMUNICATION

BACKGROUND

Embodiments of the invention relate to selecting incoming message channels in a V2X communication network.

V2X is a form of technology that allows vehicles to communicate with various parts of the traffic system around them. Also known as connected-vehicle-to-everything communication, it has several components. One of them is V2V, or vehicle to vehicle, which allows vehicles to communicate with one another.

V2X systems are mainly geared toward safety, and they can be programmed to be aware of surroundings in order to help prevent collisions. V2V allows vehicles to communicate with other vehicles. V2I, or vehicle to infrastructure, allows vehicles to communicate with external systems such as streetlights, buildings, and even cyclists or pedestrians.

In the V2V concept, when two or more vehicles or roadside stations are in radio communication range, they connect automatically and establish an ad hoc network which enables the sharing of position, speed, and direction data. Each vehicle may also be a router that allows sending messages over multi hop to more distant vehicles and roadside stations. The routing algorithm is based on the position of the vehicles and is able to handle fast changes of the network topology.

V2I in particular can improve traffic efficiency and support eco-friendly driving. The infrastructure plays a coordination role by gathering global or local information on traffic and road conditions and then suggesting or imposing certain behaviors on a group of vehicles. Depending on the traffic load, V2X roadside units can issue advisories to drivers recommending alternate routes or offering parking facilities near public transportation stations supporting multi-modal transportation or offering vehicle service facilities for a vehicle that has faults.

While using a V2X communication network, a vehicle may receive multiple messages with different information to perform various functions during an emergency situation. Those messages may confuse the vehicle systems into performing undesired actions. It would be an improvement for the vehicle to receive a single reliable message in order to properly execute emergency situation system functions.

BRIEF SUMMARY

In accordance with embodiments of the invention, a trigger event is detected based on a vehicle malfunction that limits maneuverability of a vehicle. An alert message is generated based on the detected trigger event, and the alert message is broadcast via a Vehicle-to-Everything (V2X) communication. Based on the detected trigger event, a receive channel mask and a transmit channel mask are generated, and a channel mask flag is set. When the channel mask flag is set, one or more incoming message channels are selected based on the incoming channel mask and the channel mask flag, and incoming V2X messages are received and processed only on the selected one or more incoming message channels. When the channel mask flag is cleared, incoming V2X messages are received and processed on the selected one or more incoming message channels and at least one additional incoming message channel.

BRIEF DESCRIPTION OF THE DRAWINGS

FIG. 3 is a table that shows SAE J2735 DSRC Standard Message Types.

DETAILED DESCRIPTION

In accordance with embodiments of the invention, an intelligent scheme automatically selects a reliable incoming message channel when a vehicle fault occurs. In this way, incoming message traffic is reduced, and incoming message security is increased.

Figure 1A:
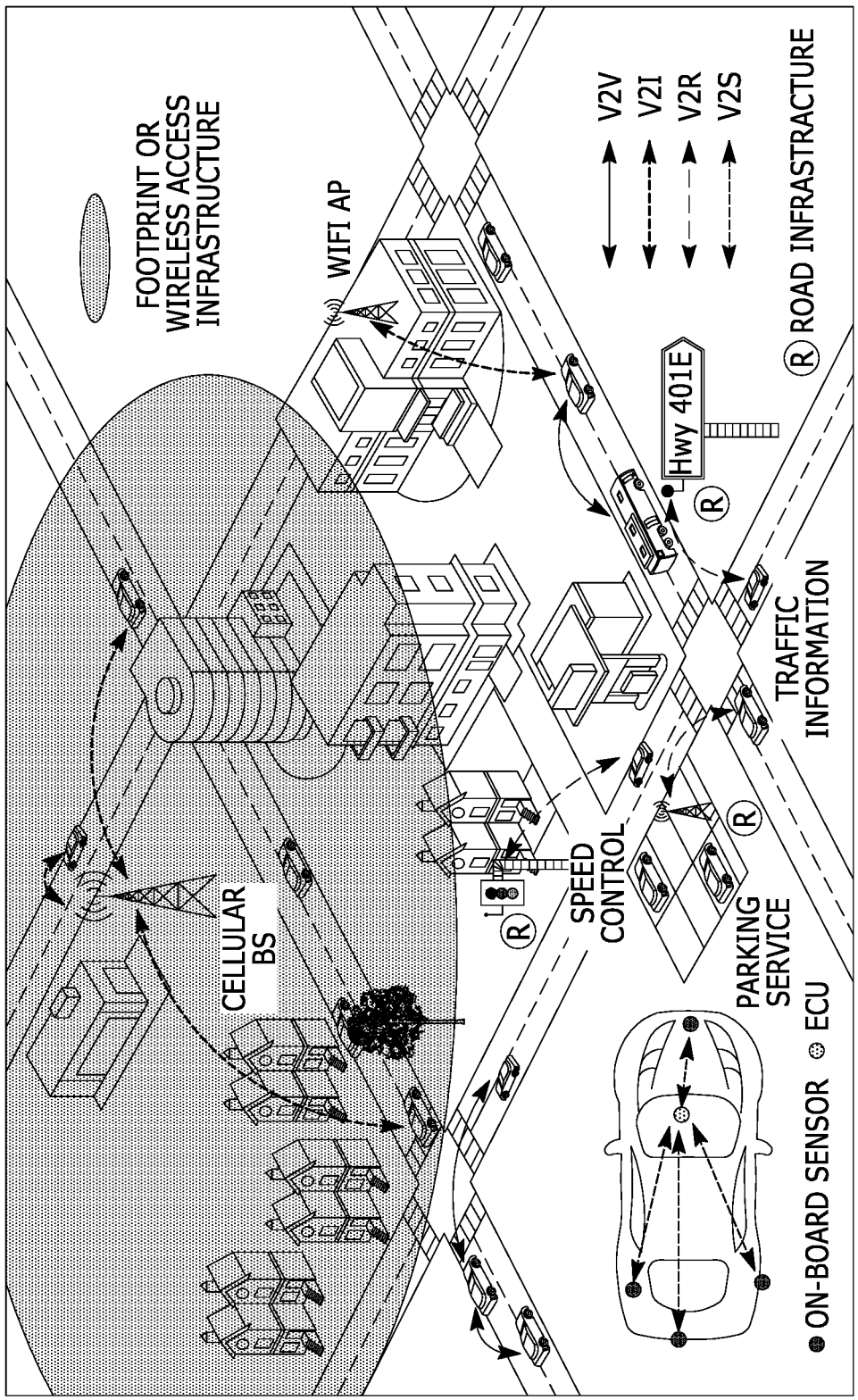
FIGS. 1A and 1B depict overviews of V2X communication technology.
Figure 1B:
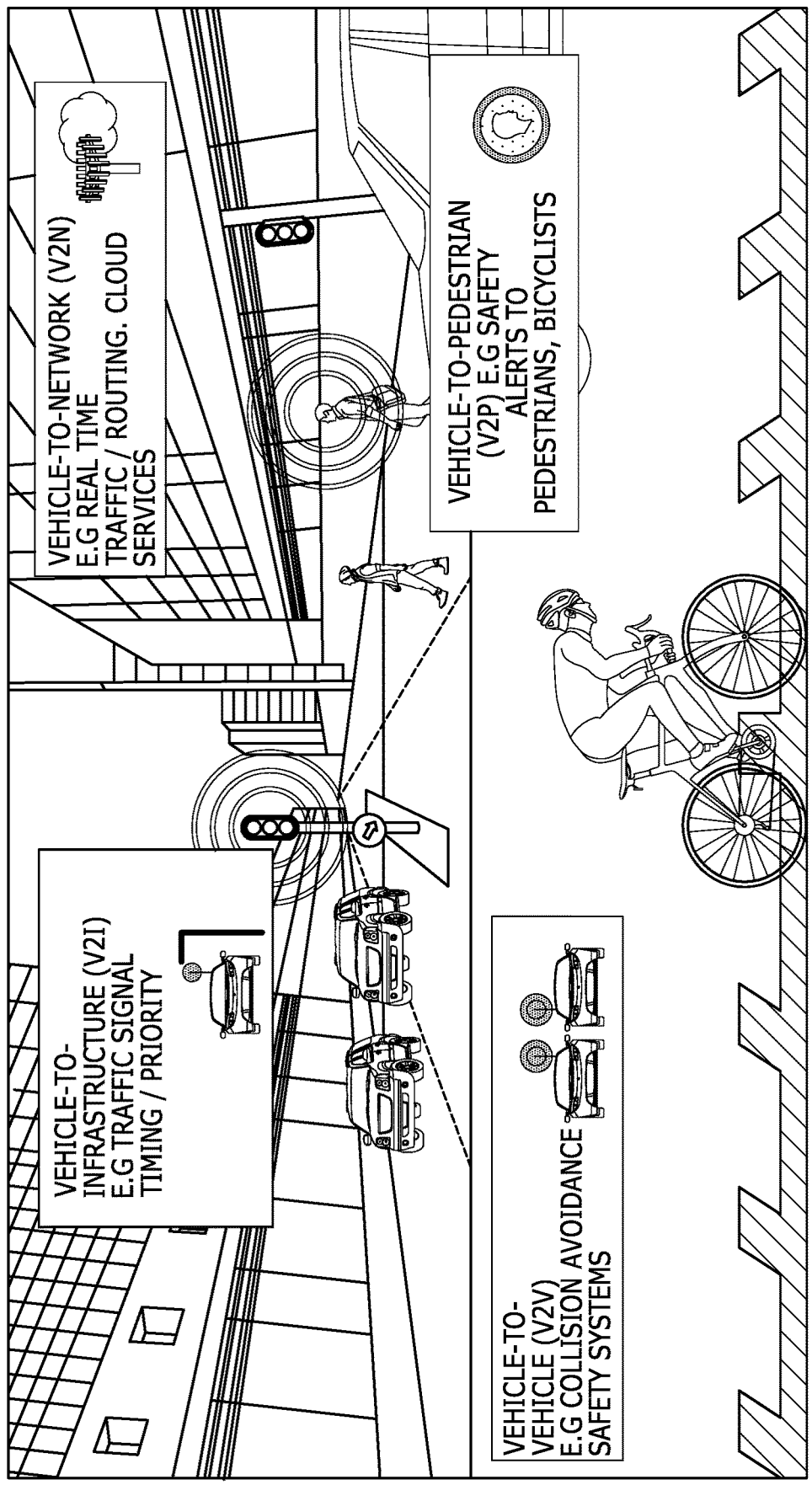

FIGS. 1A and 1B depict overviews of V2X communication technology. V2X includes the communication of Vehicle-to-vehicle (V2V), Vehicle-to-Road Infrastructure (V2R), Vehicle-to-Infrastructure (V2I), Vehicle-to-Sensor on-board (V2S), and Vehicle-to-pedestrian (V2P).

V2X technology is based on Dedicated Short-Range Communication (DSRC), a two-way, short-range wireless communications technology designed especially for moving objects like vehicles. In general, it allows vehicles to exchange data with other vehicles and roadside units, sensors and actors similar to Wi-Fi communication, but using efficient ad-hoc features.

It depends on the number of vehicles equipped with DSRC technology. With V2X, a car is able to sense its surroundings. It can use information about vehicles in its vicinity to calculate its current and future positions thereby creating situational awareness. This enables a number of safety services for avoiding crashes or predicting dangerous situations.

As is known in the art, an on-board V2X transceiver of a vehicle may include a processor, a memory, a communication interface, and an antenna assembly for enabling wireless communication.

Figure 2:
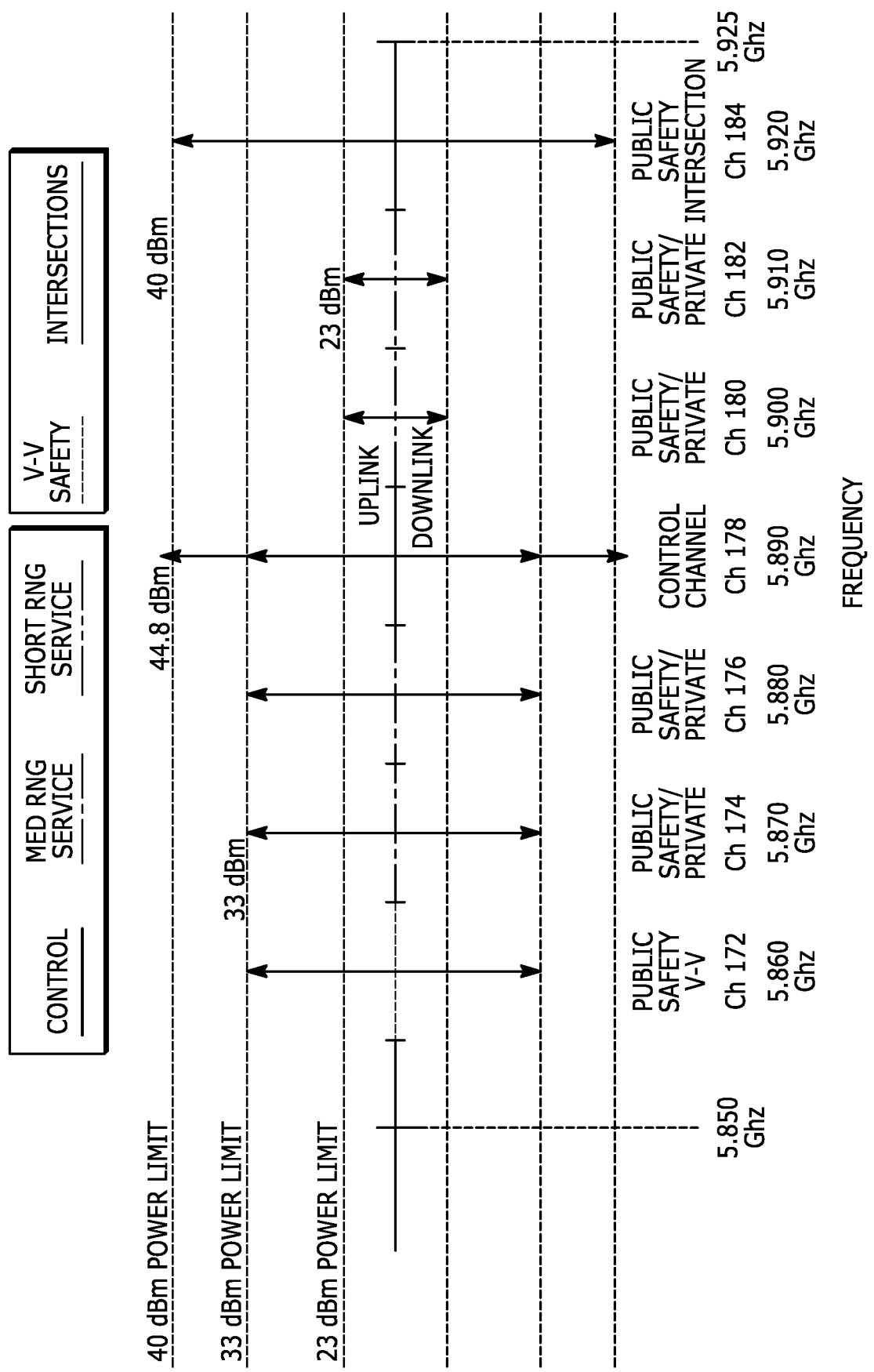
FIG. 2 is a frequency spectrum for DSRC 5.9 GHz band in accordance with IEEE 802.11.

FIG. 2 is a frequency spectrum for DSRC 5.9 GHz band in accordance with IEEE 802.11.

In the United States, 75 MHz of spectrum in the 5.9 GHz frequency band has been allocated for DSRC applications. Out of the 75 MHz spectrum, 5 MHz is reserved as the guard band and seven 10-MHz channels are defined as in shown in FIG. 2. The available spectrum is configured into 1 control channel (CCH) and 6 service channels (SCHs).

The CCH is reserved for carrying high-priority short messages or management data, while other data is transmitted on the SCHs. The pair of channels (channel 174 and 176, and channel 180 and 182) can be combined to form a single 20-MHz channel, channel 175 and 181, respectively. V2V safety messages are expected to be exchanged on Channel 172, a specific channel designated for safety. The frequency-channel usage can be configured by vehicle manufacturers.

A single-channel is defined that can either transmit or receive on a single 10-MHz channel, but not simultaneously.

FIG. 3 is a table that shows SAE J2735 DSRC Standard Message Types. The SAE J2735 DSRC Message Set Dictionary standard defines fifteen messages that collectively enable a core set of DSRC applications. The SAE DSRC committee is also developing a complementary standard, J2945.1, which defines additional rules for using BSMs to implement V2V safety systems.

Figure 4:
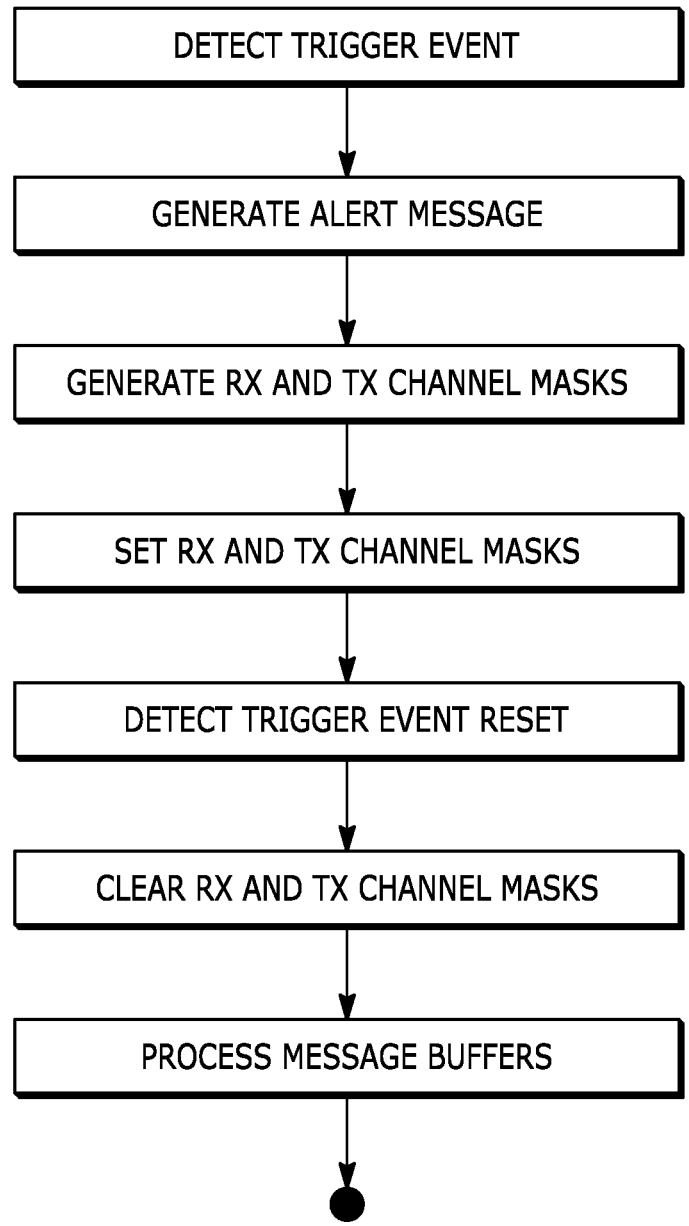
FIG. 4 is a flow chart showing steps for generating an alert message and setting and resetting receive and transmit channel masks in accordance with embodiments of the invention.

FIG. 4 is a flow chart showing steps for generating an alert message and setting and resetting receive and transmit channel masks in accordance with embodiments of the invention.

Figure 5:
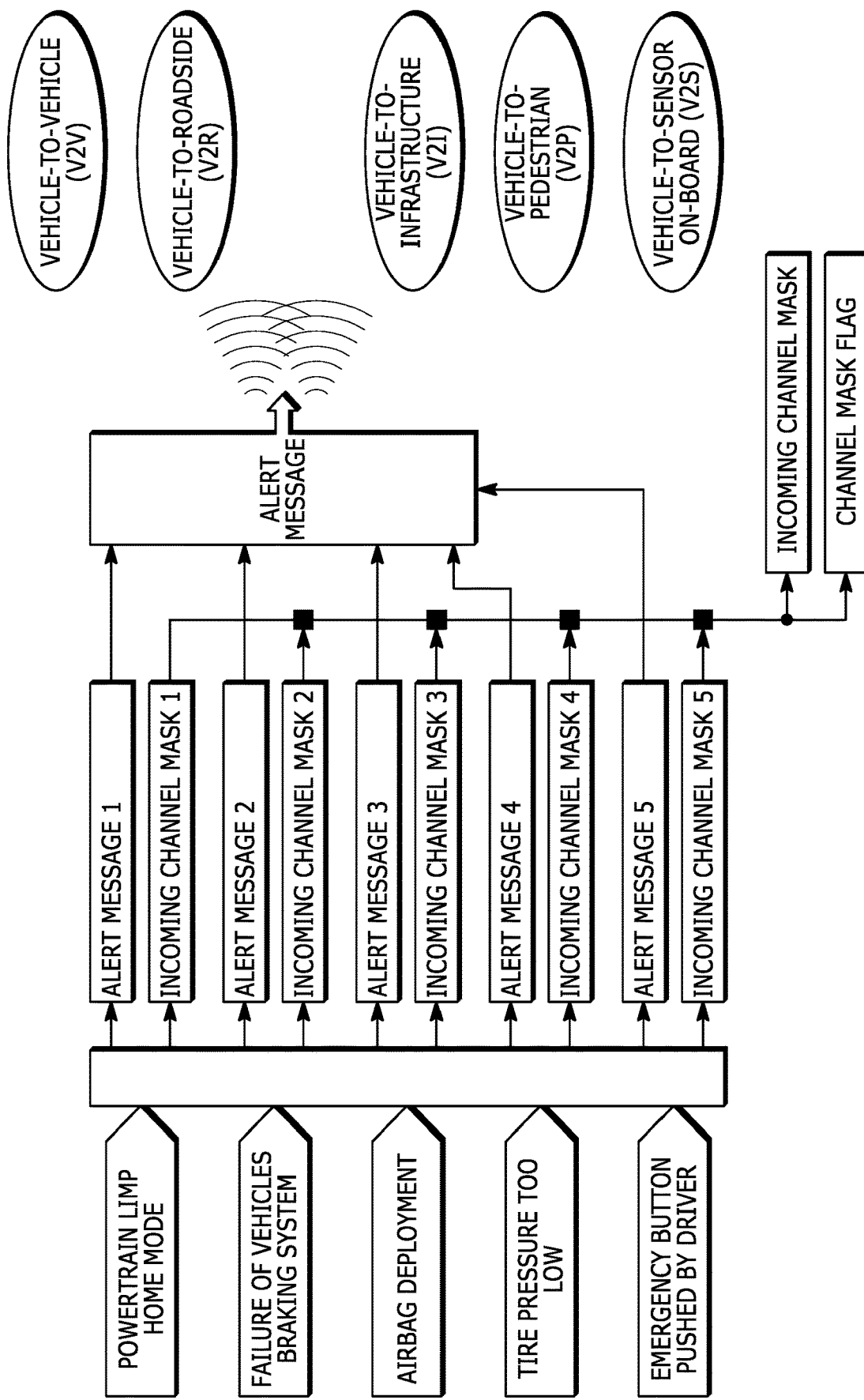
FIG. 5 is a schematic depiction of an apparatus for automatically generating vehicle alert messages in accordance with embodiments of the invention.

FIG. 5 is a schematic depiction of an apparatus for automatically generating vehicle alert messages in accordance with embodiments of the invention. The inputs may be any vehicle malfunction that limits the maneuverability of the vehicle. Each vehicle malfunction may generate a corresponding alert message and an associated incoming channel mask. Under normal operating conditions, the channel mask flag may be set to false, inactive, or the like. If any of inputs become true, active, or the like, it triggers an equipped DSRC device to broadcast one or more vehicle alert messages via a V2X communication. An incoming channel mask is also generated and a corresponding channel mask flag is set to true, active, or the like. Both the incoming channel mask and the channel mask flag are used for incoming message channel selection. The vehicle alert message format is in accordance with the definition of SAE J2735 DSRC Standard Message Types. The V2X network may include, but is not limited to: Vehicle-to-vehicle (V2V), Vehicle-to-roadside (V2R), Vehicle-to-infrastructure (V2I), Vehicle-to-pedestrian (V2P), Vehicle-to-motorcycle (V2M), and Vehicle-to-transit (V2T). It is a decentralized structure. In this structure, information is interchanged on a "local" basis (that is, among a group of vehicles in proximity to each other). The communication technology is based on IEEE 802.11, as shown in FIG. 6.

Figure 6:
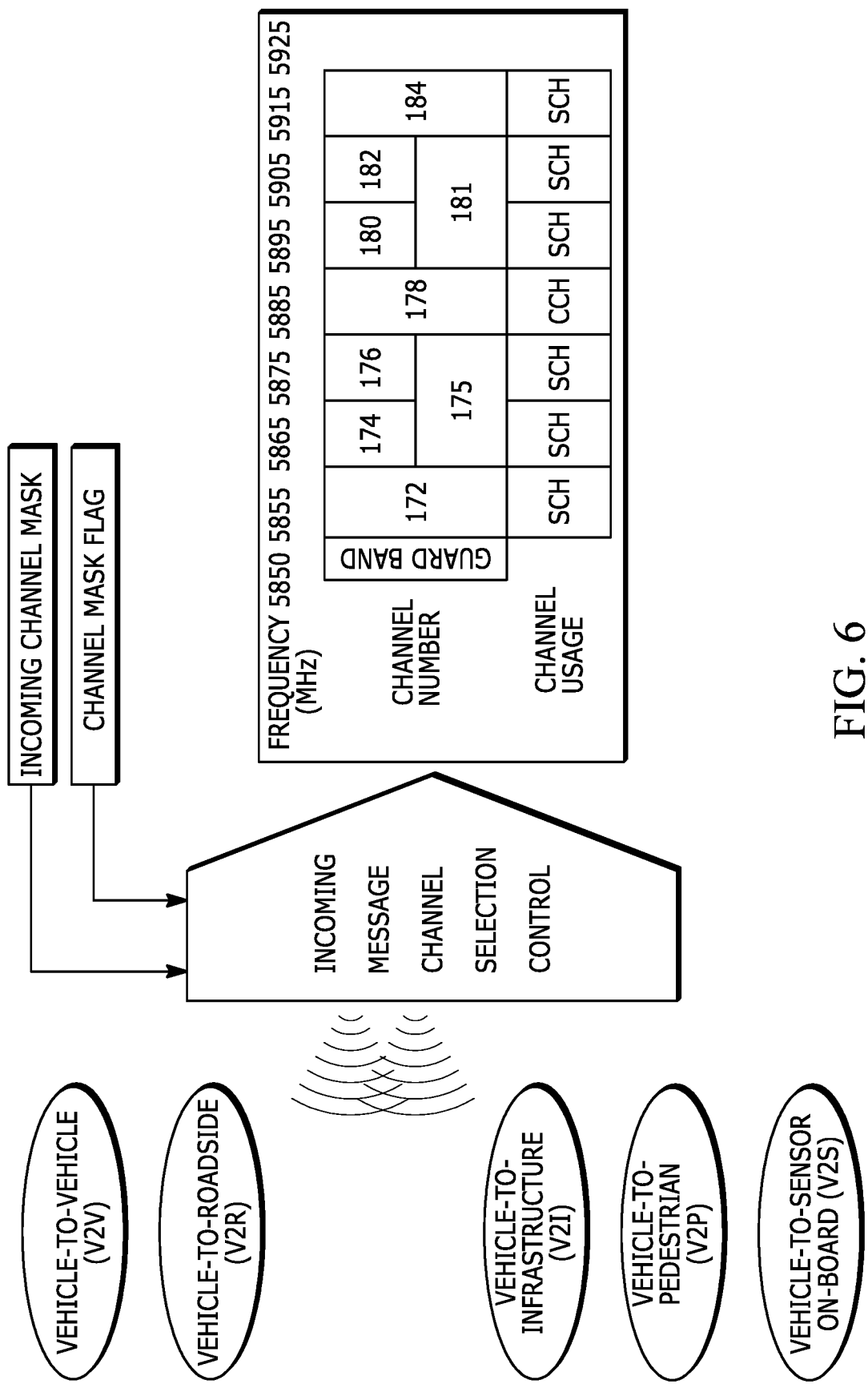
FIG. 6 schematically depicts incoming message channel selection control in accordance with embodiments of the invention.

FIG. 6 schematically depicts incoming message channel selection control in accordance with embodiments of the invention. If the channel mask flag is false, inactive, or the like, all incoming message channels are selected for receiving messages.

If the channel mask flag is true, active, or the like, the incoming channel mask is used by the incoming message channel selection control to select an incoming channel. For example, upon the occurrence of an airbag deployed event, an emergency message is sent out via the V2X communication network, as depicted in FIG. 5. Again referring to FIG. 5, while the driver is waiting for local authority's prompt assistance, the incoming message channels of Vehicle-to-infrastructure (V2I) and Vehicle-to-roadside (V2R) may be selected according to incoming channel mask 3. The incoming message channels of Vehicle-to-pedestrian (V2P), Vehicle-to-Sensor on-board (V2S), and Vehicle-to-vehicle (V2V) may be unselected. The Vehicle-to-infrastructure (V2I) is considered to be an official and reliable source to direct a driving emergency vehicle.

In this way, an intelligent scheme is implemented to automatically select a reliable incoming message channel during an emergency situation involving a vehicle. The scheme not only reduces incoming message process load, but also increases incoming message security because the selected incoming channel is a more secure channel.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method comprising:
    detecting a trigger event based on a vehicle malfunction that limits maneuverability of a vehicle;
    generating an alert message based at least in part on the detected trigger event and broadcasting the alert message via a Vehicle-to-Everything (V2X) communication;
    based at least in part on the detected trigger event, generating a receive channel mask and a transmit channel mask and setting a channel mask flag;
    when the channel mask flag is set, selecting one or more incoming message channels based on the incoming channel mask and the channel mask flag and receiving and processing incoming V2X messages only on the selected one or more incoming message channels; and
    when the channel mask flag is cleared, receiving and processing incoming V2X messages on the selected one or more incoming message channels and at least one additional incoming message channel.

2. The method of claim 1, wherein the trigger event is based on the vehicle being in a powertrain limp home mode.

3. The method of claim 1, wherein the trigger event is based on a failure of a braking system of the vehicle.

4. The method of claim 1, wherein the trigger event is based on a deployment of an airbag of the vehicle.

5. The method of claim 4, wherein the selected one or more incoming message channels are both Vehicle-to-Infrastructure (V2I) and Vehicle-to-Roadside (V2R) corresponding to the deployment of the airbag of the vehicle.

6. The method of claim 5, wherein the at least one additional message channel, corresponding to the deployment of the airbag of the vehicle, includes: Vehicle-to-Pedestrian (V2P), Vehicle-to-Sensor on-board (V2S), and Vehicle-to-Vehicle (V2V).

7. The method of claim 1, wherein the trigger event is based on air pressure of a tire of the vehicle being below a predetermined threshold.

8. The method of claim 1, wherein the trigger event is based on an emergency button being pressed by a driver of the vehicle.

9. The method of claim 1, wherein the broadcast V2X communication includes at least one of: a Vehicle-to-Vehicle (V2V) communication, a Vehicle-to-Roadside (V2R) communication, a Vehicle-to-Infrastructure (V2I) communication, a Vehicle-to-Pedestrian (V2P) communication, and a Vehicle-to-Sensor-on-Board (V2S) communication.

10. An apparatus configured to perform operations comprising:
    detecting a trigger event based on a vehicle malfunction that limits maneuverability of a vehicle;
    generating an alert message based at least in part on the detected trigger event and broadcasting the alert message via a Vehicle-to-Everything (V2X) communication;
    based at least in part on the detected trigger event, generating a receive channel mask and a transmit channel mask and setting a channel mask flag;
    when the channel mask flag is set, selecting one or more incoming message channels based on the incoming channel mask and the channel mask flag and receiving and processing incoming V2X messages only on the selected one or more incoming message channels; and when the channel mask flag is cleared, receiving and processing incoming V2X messages on the selected one or more incoming message channels and at least one additional incoming message channel.

11. The apparatus of claim 10, wherein the trigger event is based on the vehicle being in a powertrain limp home mode.

12. The apparatus of claim 10, wherein the trigger event is based on a failure of a braking system of the vehicle.

13. The apparatus of claim 10, wherein the trigger event is based on a deployment of an airbag of the vehicle.

14. The apparatus of claim 13, wherein the selected one or more incoming message channels are both Vehicle-to-Infrastructure (V2I) and Vehicle-to-Roadside (V2R) corresponding to the deployment of the airbag of the vehicle.

15. The apparatus of claim 14, wherein the at least one additional message channel, corresponding to the deployment of the airbag of the vehicle, includes: Vehicle-to-Pedestrian (V2P), Vehicle-to-Sensor on-board (V2S), and Vehicle-to-Vehicle (V2V).

16. The apparatus of claim 10, wherein the trigger event is based on air pressure of a tire of the vehicle being below a predetermined threshold.

17. The apparatus of claim 10, wherein the trigger event is based on an emergency button being pressed by a driver of the vehicle.

18. The apparatus of claim 10, wherein the broadcast V2X communication includes at least one of: a Vehicle-to-Vehicle (V2V) communication, a Vehicle-to-Roadside (V2R) communication, a Vehicle-to-Infrastructure (V2I) communication, a Vehicle-to-Pedestrian (V2P) communication, and a Vehicle-to-Sensor-on-Board (V2S) communication.

* * * * *